United States Patent
Haga et al.

(10) Patent No.: US 6,767,285 B2
(45) Date of Patent: Jul. 27, 2004

(54) IMAGE DISPLAY METHOD, COMPUTER GAME PROCESSING METHOD AND RECORDING MEDIUM

(75) Inventors: Norio Haga, Tokyo (JP); Kota Matsumoto, Tokyo (JP)

(73) Assignee: Sega Corporation (JP)

( * ) Notice: Subject to any disclaimer, the term of this patent is extended or adjusted under 35 U.S.C. 154(b) by 170 days.

(21) Appl. No.: 09/986,147

(22) Filed: Nov. 7, 2001

(65) Prior Publication Data

US 2002/0090995 A1 Jul. 11, 2002

(30) Foreign Application Priority Data

Nov. 24, 2000 (JP) ........................................ 2000-358448

(51) Int. Cl.[7] .............................................. A63F 13/00
(52) U.S. Cl. ........................................ 463/31; 345/619
(58) Field of Search ........................... 463/1, 8, 30–34, 463/42, 47.1; 345/418–419, 427, 619, 503–505, 473, 949; 701/28

(56) References Cited

U.S. PATENT DOCUMENTS

| | | | | |
|---|---|---|---|---|
| 5,566,280 A | * | 10/1996 | Fukui et al. ................. 345/419 |
| 5,779,548 A | * | 7/1998 | Asai et al. .................... 463/31 |
| 5,862,229 A | * | 1/1999 | Shimizu ...................... 381/17 |
| 5,880,709 A | * | 3/1999 | Itai et al. .................... 345/629 |
| 6,175,366 B1 | * | 1/2001 | Watanabe et al. ........... 345/422 |
| 6,259,431 B1 | * | 7/2001 | Futatsugi et al. ........... 345/157 |
| 6,320,599 B1 | * | 11/2001 | Sciammarella et al. ..... 345/667 |
| 6,424,353 B2 | * | 7/2002 | Yamamoto et al. ......... 345/619 |
| 6,603,479 B1 | * | 8/2003 | Mifune et al. .............. 345/474 |
| 2003/0186740 A1 | * | 10/2003 | Goden et al. ................. 463/30 |

* cited by examiner

*Primary Examiner*—Teresa Walberg
*Assistant Examiner*—Scott E. Jones
(74) *Attorney, Agent, or Firm*—Dickstein Shapiro Morin & Oshinsky LLP

(57) ABSTRACT

To improve a screen display on the computer game device, according to the present invention, when a game character and its attribute information are to be displayed on the computer game screen and the display size of the game character is to be enlarged or reduced, it is possible to avoid disadvantages such as the attribute information being overly enlarged and thereby covering a large portion of the screen or being overly reduced and thereby becoming illegible by fixing the display size of the game character's attribute information, and provide an easily viewable screen to the player.

6 Claims, 16 Drawing Sheets

Attribute Information Object

Character

IMAGE DISPLAY METHOD, COMPUTER GAME PROCESSING METHOD AND RECORDING MEDIUM

BACKGROUND OF THE INVENTION

1. Field of the Invention

The present invention relates to an image display method and computer game processing method in a computer game device, and particularly to an image display method and computer game processing method in a battle game where game characters battle each other, and to a recording medium storing a program for controlling the computer game device.

2. Description of the Related Art

Conventionally known are computer games wherein a player views the screen displayed on the monitor of a computer game device to operate his/her game character with levers and buttons to battle one or more enemy characters in a virtual space. Battle games, for example, realize battles between a self-character and an enemy character operated by another player using a different computer game device by connecting a plurality of computer game devices via a communication line.

When playing a battle game with a plurality of players as described above, particularly in battle games wherein three or more players are able to compete with each other, the following problems arise.

Problem 1

There are cases when attribute information regarding a game character is displayed in the vicinity of such game character shown on the monitor. Attribute information is, for example, the name or number of the player operating the game character, or the score obtained by the game character during the battle (including the designation mark (▼)). When the game character pertaining to the attribute information is displayed by being enlarged or reduced, conventionally, such attribute information was displayed with the same magnification as the enlargement or reduction, or displayed in the same size regardless of the enlargement or reduction of the subject character.

FIG. 15 and FIG. 16 are examples of screens where the game character and its attribute information object are displayed. FIGS. 15A, 15B and 15C show a case where the game character and its attribute information object are gradually enlarged and displayed, and FIGS. 16A, 16B and 16C show a case where the character and its attribute information object are gradually reduced and displayed.

As shown in FIGS. 15A, 15B and 15C, when the attribute information object is enlarged in accordance with the enlargement of the character, there is a problem in that some attribute information objects may cover the monitor screen and make the screen difficult to view. Meanwhile, as shown in FIGS. 16A, 16B and 16C, when the attribute information object is reduced in accordance with the reduction of the character, there is a problem in that the attribute information becomes illegible.

Whereas, if the size of this attribute information object is kept the same regardless of the enlargement/reduction of the game character, there is a problem in that it becomes difficult to distinguish which character's attribute information it is, particularly when a plurality of game characters are displayed on the screen and game characters are overlapped and displayed on the screen, or when they are displayed at close distance.

Problem 2

There are cases when a battle game is already in progress among a number of players less than the maximum number of players possible, and a new player enters such battle game in midcourse. If the maximum number of players to play the battle game is two, and another player starts a game in a different computer game device when one player is playing a one-player game against the computer, the battle game was mandatorily switched to a battle game between players. Here, the one-player battle game against the computer is suspended, and a new battle game between players is started. However, as the battle game against the computer is usually a game to fill up the time until another player joins the game, there is no problem even though the one-player battle game against the computer is suspended.

If the maximum number of players to play the battle game is three or more, however, the following problems arise when midcourse participation is permitted unconditionally. In other words, when a battle game is already in progress among a number of players less than the maximum number of players possible, and a new player enters such battle game in midcourse, the battle game being played among the players was mandatorily reset, and a new battle game among players including the new player was started. In such a case, it is possible that the player's emotions will be significantly ruined. For example, as the battle game will be started over from the beginning while disregarding all results up to the midcourse of the battle game that was in progress, this will be highly disadvantageous for the player who was in the lead in the initial battle game.

Meanwhile, if the midcourse results of the battle game are maintained when a player newly joins, this will be highly disadvantageous for the new player and the benefits of midcourse participation will be lost.

Problem 3

When the result of the battle among the game characters cannot be decided within the time limit of the battle game, conventionally, victory or defeat was decided pursuant to the high or low of the numerically converted remaining physical energy of the respective game characters. The physical energy gradually decreases in accordance with the number or type of attacks made by the enemy character during the game.

Thus, if the remaining physical energy of one's character is even slightly higher than the enemy character, there was a problem in that it was possible to conduct a vigorless and low-risk battle (e.g., avoid fighting, run away) until the time limit and win by decision. Specifically, in a battle game where three or more players are able to participate, it is relatively easy to run around without making one's character participate in the battle while the other game characters are fighting each other. Here, as the physical energy of the game character not participating in the battle will not decrease, there is a possibility that the game character not participating in the battle will win.

SUMMARY OF THE INVENTION

Accordingly, an object of the present invention is to resolve the problems encountered in the aforementioned battle games played by a plurality of players, and to provide an image display method and computer game processing method of a computer game device for executing a battle game with improved game amusement, and a program product for executing such method.

To resolve the first problem, according to the first present invention, when a game character and its attribute information are to be displayed on the computer game screen and the display size of the game character is to be enlarged or reduced, it is possible to avoid disadvantages such as the attribute information being overly enlarged and thereby covering a large portion of the screen or being overly reduced and thereby becoming illegible by fixing the display size of the game character's attribute information, and provide an easily viewable screen to the player.

To resolve the second problem, according to the second present invention, when a battle game is in progress among a number of players less than the maximum number of players possible in a battle game where three or more players can participate and a new player starts enters the battle game, it is determined whether or not midcourse participation should be authorized in accordance with the status of the battle game in progress or the elapsed time. It is thereby possible to avoid the inconvenience of the player who has playing the battle game in his/her favor from encountering the disadvantage of the battle game being reset pursuant to such midcourse participation. Moreover, the business efficiency will be increased as it is possible to avoid the battle game from being reset immediately before the end of the game.

Further, to resolve the third problem, according to the third present invention, the degree of activity of the game character during the battle game is calculated, and the victory/defeat is judged pursuant to such degree of activity of the game character when the victory/defeat of the battle is not finalized within a time limit. Therefore, in comparison to cases of judging the victory/defeat by the remaining energy, it is possible to make a rightful judgment of victory/defeat by preventing a player that runs away in the battle game or fights in a manner of not decreasing one's energy from winning.

DESCRIPTION OF THE PREFERRED EMBODIMENTS

Embodiments of the present are now described below. The technical scope of the present invention, however, shall not be limited to the following embodiments.

Figure 1:
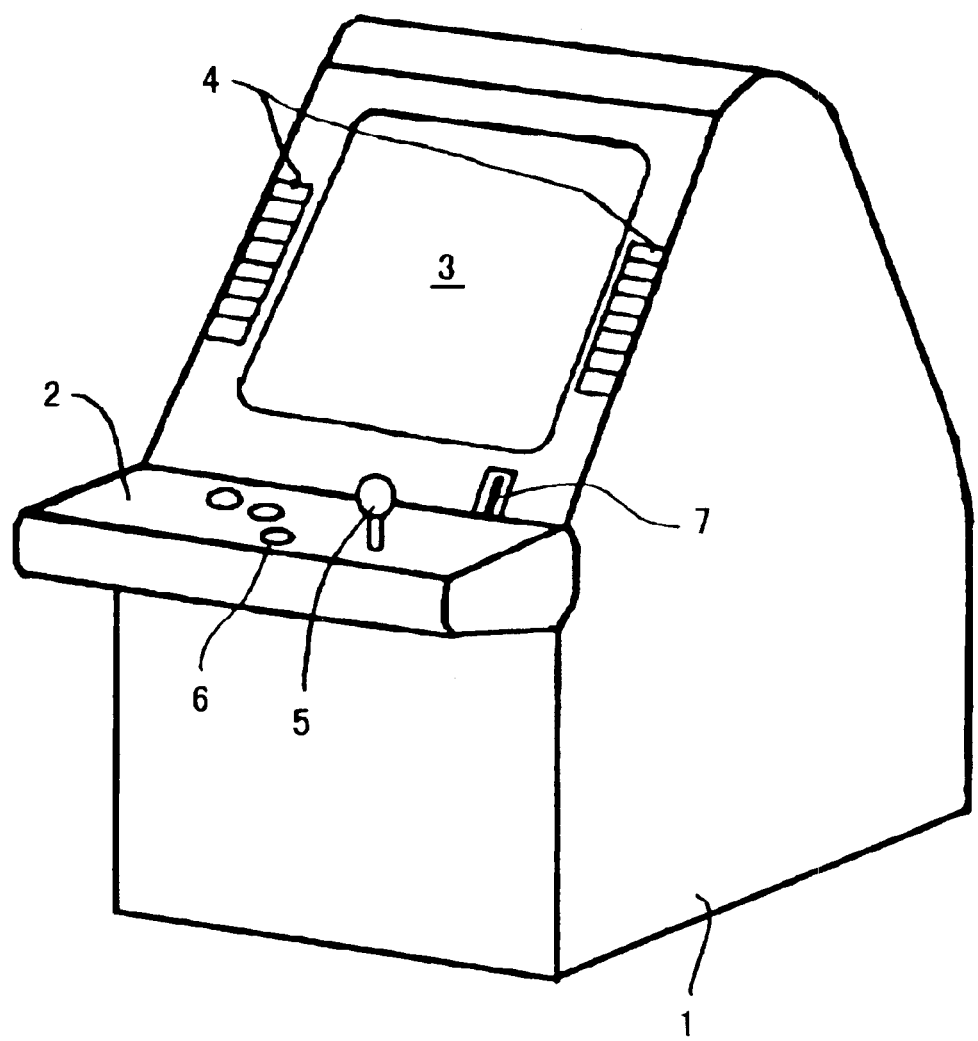
FIG. 1 is the external view of the computer game device in an embodiment of the present invention.

FIG. 1 is an external view of the computer game device (hereinafter referred to as "game device") in an embodiment of the present invention. A housing 1 is provided with an operation panel 2, a monitor 3 and speakers 4. Moreover, the operation panel 2 is provided with a lever 5 and buttons 6. A coin insertion slot 7 is also provided to the housing 1. A player sitting or standing in front of the housing starts a battle game by inserting a prescribed fee into the coin insertion slot 7.

Figure 2A:
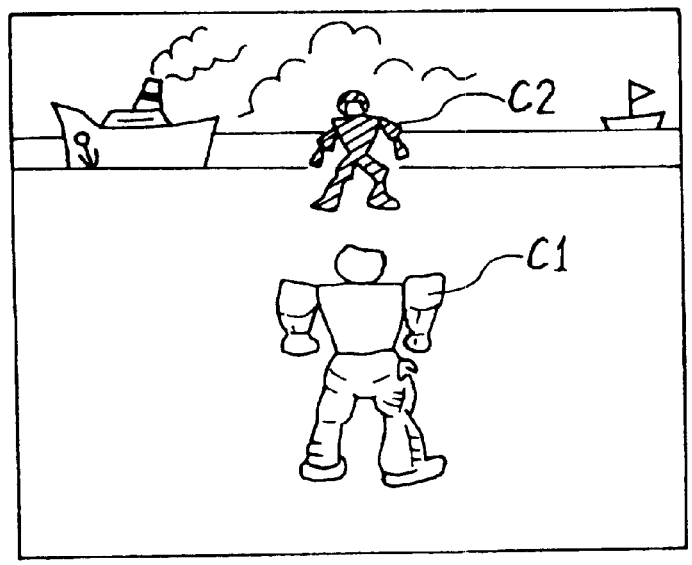
FIGS. 2A and 2B are examples of a battle game screen displayed on a monitor.
Figure 2B:
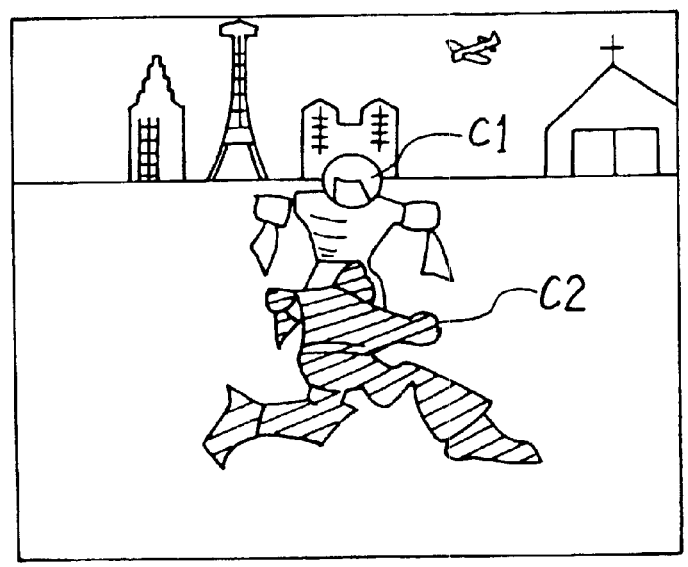

FIGS. 2A and 2B are examples of a battle game screen displayed on the monitor 3. The player operates his/her game character C1 displayed on the screen of the monitor 3 and fights the enemy character C2 by operating the lever 5 and buttons 6 while viewing the game screen displayed on the monitor 3.

Figure 3:
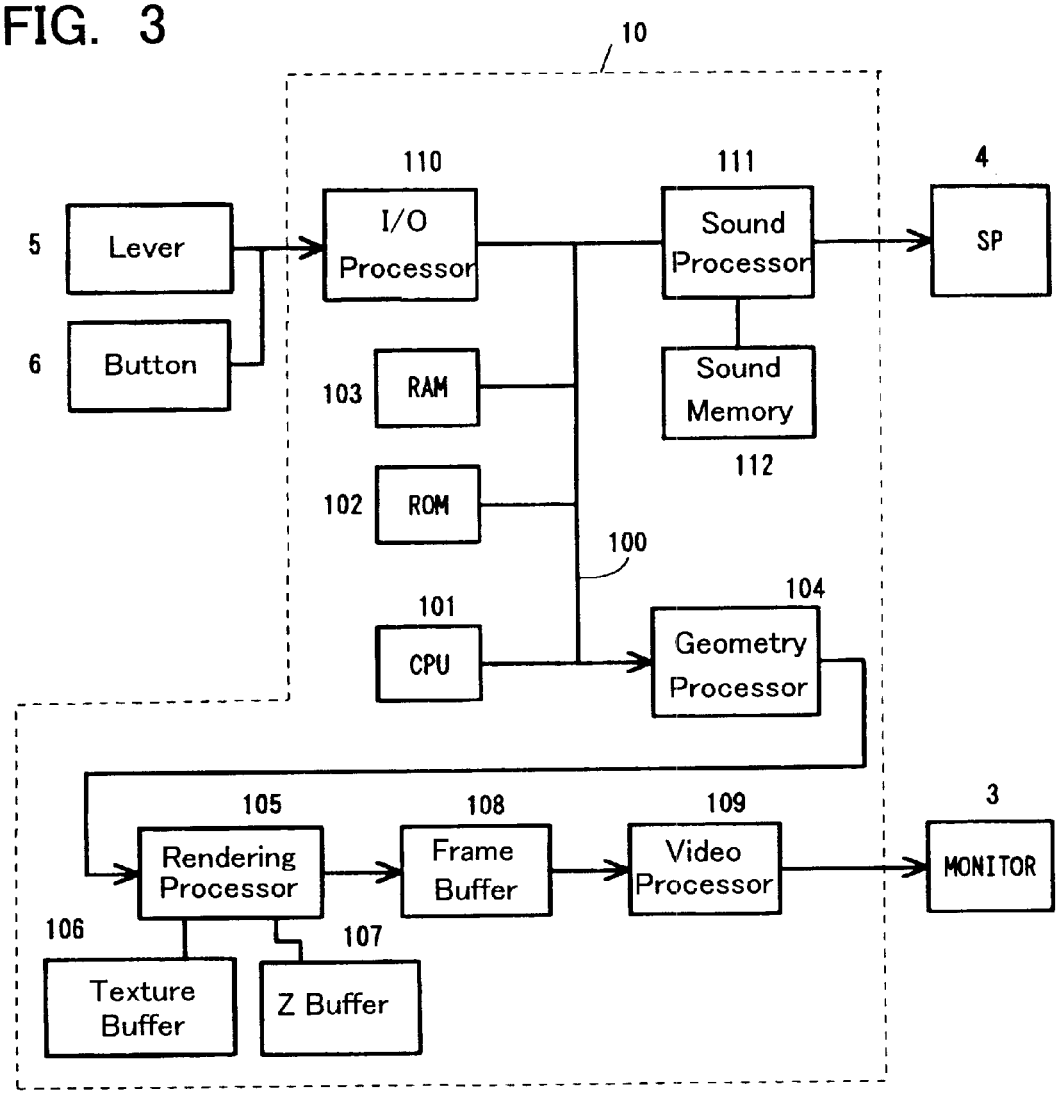
FIG. 3 is a functional block diagram of a computer game device in an embodiment of the present invention.

FIG. 3 is a functional block diagram of the game device in an embodiment of the present invention; that is, a block diagram showing a structural example of the game unit of the present invention built in the aforementioned game device. In FIG. 3, the area 10 surrounded by the dotted line is the portion that is stored in the game unit main body. According to FIG. 3, the various structural elements including the CPU described below are connected via the bus 100.

The CPU 101, which is the controlling unit, controls the execution of the program based on the game program stored in a ROM 102. Polygon data structuring the game characters and background is also stored in the ROM 102. A RAM 103 stores prescribed game parameters such as the coordinates in a virtual space of game characters renewed pursuant to the game progress.

In addition, parameters temporarily stored in the RAM 103 are sent to the geometry processor 104. The geometry processor 104 conducts prescribed coordinate conversion processing based on vertex data of polygons structuring the game characters and background in a three dimensional space of the game. To simply describe the coordinate conversion processing, coordinates of the polygons in the world coordinate system set in a three-dimensional virtual space are converted into a viewing point coordinate system when viewing the virtual space of the visual line direction with one coordinate point being the viewing point in such world coordinate system.

Further connected to the geometry processor 104 is a rendering processor 105. Connected to the rendering processor 105 is a texture buffer 106 which reads and temporarily stores the aforementioned polygon vertex data and texture data to be mapped on such polygon from the ROM 102. Moreover, the rendering processor 105 conducts coloring, shading and texture application to the respective polygons based on the texture data of polygons stored in the texture buffer 106.

Furthermore, the rendering processor 105 converts the polygon coordinates converted into a viewing point coordinate system in a three-dimensional virtual space into a two-dimensional coordinate system so as to be displayed on the monitor 3. In addition, stored in a Z buffer 107 connected to the rendering processor 105 is data information (e.g., data regarding which polygon is to be displayed in front) relating to the depth direction (Z direction) upon converting the aforementioned polygon coordinates from a three-dimensional coordinate system into a two-dimensional coordinate system.

Further, a frame buffer 108 is connected to the output side of the rendering processor 105. One screen worth of data to be displayed on the monitor 3 is stored in the frame buffer 108. One screen worth of image data read out from the frame buffer 108 is converted into video signals by a video processor 109, and successively displayed on the monitor 3.

Moreover, operation units such as the lever 5 and buttons 6 to be operated by the player are connected via the I/O processor 110. The CPU 101 performs arithmetical operations of coordinates of game characters and the like in the virtual space based on the operation signals input from such operation units, and the results thereof are sent to the geometry processor 104.

A sound processor 111 is connected to the bus 100, and controls the sound production of PCM/FM sound sources. A sound memory 112 storing sound data is connected to this sound processor 111.

Sound data controlled by the sound processor 111 is converted into analog signals from a digital sound source via a D/A conversion circuit not shown, and sends audio signals to the speakers 4.

Next, the method of seeking the aforementioned display coordinates of game characters is explained. Foremost, the position of the game character in the aforementioned virtual space of the game is provided as the positional coordinates $(X_W, Y_W, Z_W)$ in three-dimensional coordinates (world coordinate system) in the virtual space. Positions of fixed objects such as the background other than the game characters in the virtual space are also provided as positional coordinates in a world coordinate system. Then, the movement of the game character in the virtual space is processed as a change in the positional coordinates of the world coordinate system. Specifically, the positional coordinates of game characters are computed by the arithmetical operation of the aforementioned CPU 101 based on the information of the distance and direction of movement contained in the operation signals from the likes of operation units described above.

Meanwhile, the image displayed on the monitor 3 is displayed as a two-dimensional image viewed from a prescribed direction from one coordinate point (viewing point coordinate) of a world coordinate system in a three-dimensional virtual space. This is as though a video camera is set in a prescribed position in the virtual space and the image taken by such video camera is displayed on the monitor 3.

Figure 4:
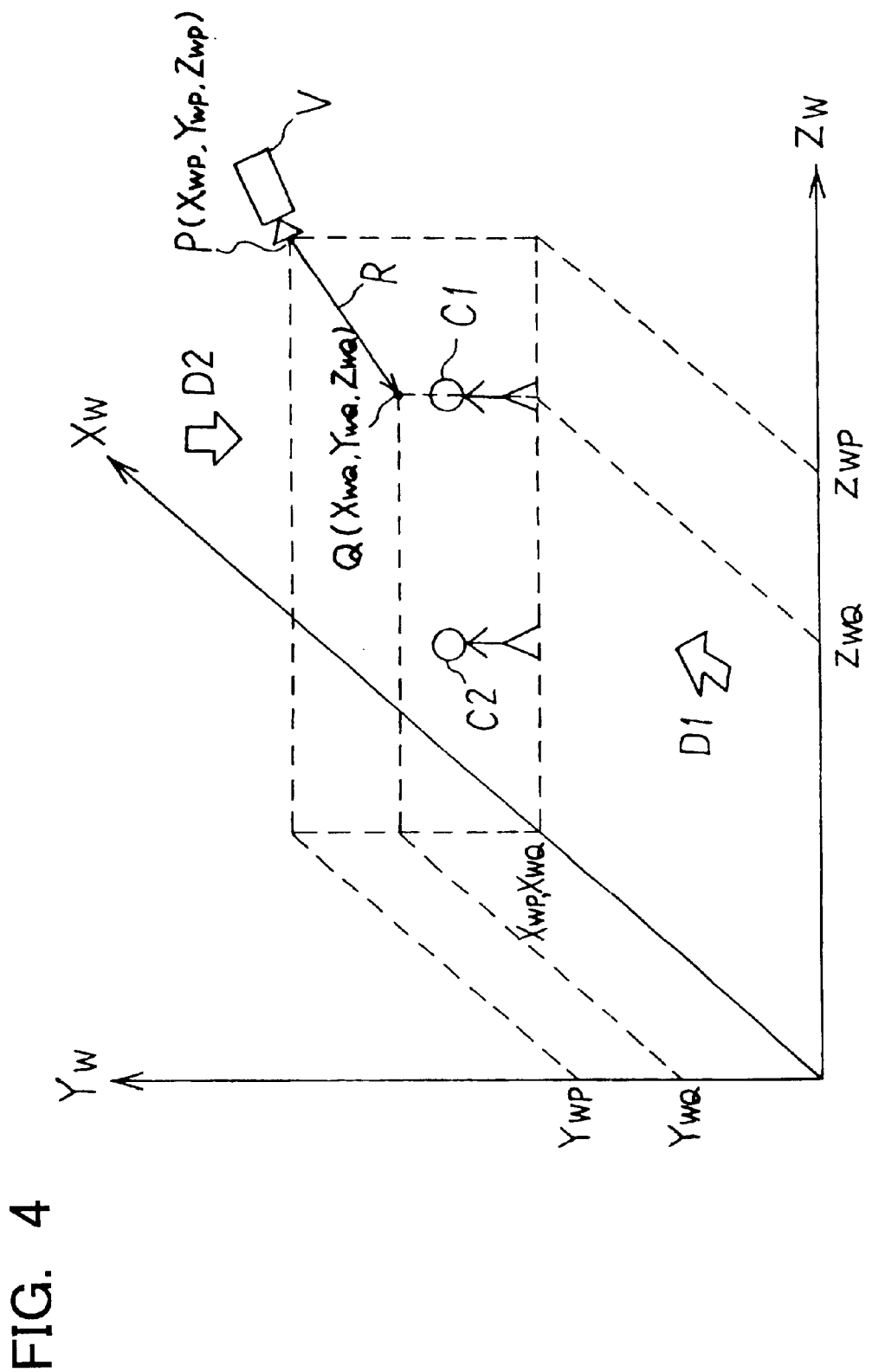
FIG. 4 is a diagram explaining the virtual three-dimensional space.

For example, when game characters C1 and C2 are disposed in a three-dimensional virtual space as shown in FIG. 4, the positional coordinates of the game characters will be determined by the positional coordinates $(X_W, Y_W, Z_W)$ of the world coordinate system. And, the viewing point coordinate P $(X_WP, Y_WP, Z_WP)$, as shown in FIG. 4, for example, is set to the viewing point coordinate P at the rear, upper oblique position of the game character C1 in a world coordinate system, and the visual line direction R from such viewing point coordinate P is, for example, set in the direction of the viewed point coordinate Q $(X_WQ, Y_WQ, Z_WQ)$ in the upper vicinity of the game character C1 (e.g., a position slightly higher than the head of the game character C1). Moreover, in the diagrams including FIG. 4 described hereinafter, a virtual video camera V is indicated in the position of viewing point coordinate P for ease of explanation.

Coordinates of the respective game characters etc. in the world coordinate system are converted into a viewing point coordinate system $(X_V, Y_V, Z_V)$ based on the viewing point coordinate P and visual line direction R by the geometry processor 104, which is a coordinate setting means, in the aforementioned FIG. 3, and is further converted into a two-dimensional screen coordinate system $(X_S, Y_S)$ pursuant to a prescribed projection conversion processing by the rendering processor 105 described in FIG. 3 above so as to be displayed on the monitor screen. Thereby, in the virtual space, even if the objects are of the same size, the object far away from the video camera V will be displayed relatively small in the monitor screen, and the object at a close distance from the video camera V will be displayed relatively large in the monitor screen.

First Embodiment

The first embodiment provides a computer game device for resolving the aforementioned (Problem 1). In the first embodiment, if the distance between the game character or its attribute information object disposed in the vicinity of such game character and the viewing point is within the scope of a prescribed distance in the virtual space, the attribute information will be displayed as usual by being enlarged/reduced in the same proportion as with the game character in accordance with the distance. Meanwhile if the distance exceeds a prescribed distance, the attribute information will not be reduced any further, and when the distance is less than a prescribed distance, the attribute information will not be enlarged any further. That is, the attribute information object will be displayed in a fixed size regardless of the distance between the viewing point and the game character or the attribute information object. For example, the attribute information is the number of points obtained by the game character when the game character is to obtain points pursuant to the progress of a computer game.

Figure 5A:
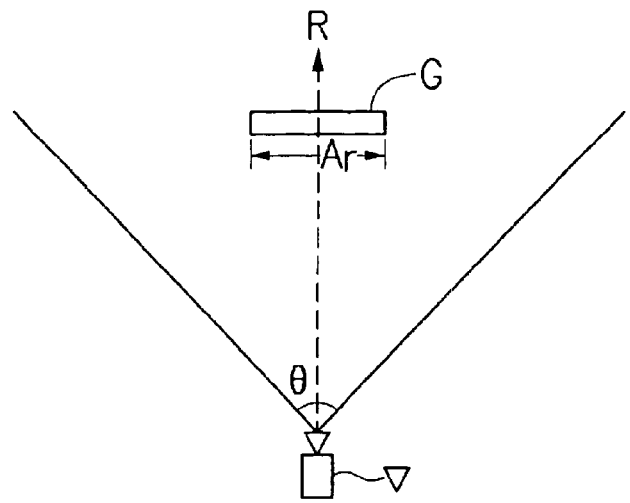
FIGS. 5A, 5B and 5C are diagrams explaining the fundamental principle of the first embodiment.

The fundamental principle of the first embodiment will be foremost explained with reference to FIGS. 5A, 5B and 5C and FIGS. 6A, 6B and 6C. As depicted in FIG. 5A, as an example, explained will be the case upon displaying a polygon G having an actual length Ar in the virtual space in the longitudinal direction intersecting with the visual line direction R of the video camera V. Further, the elevation angle of the video camera V is θ.

Figure 5B:
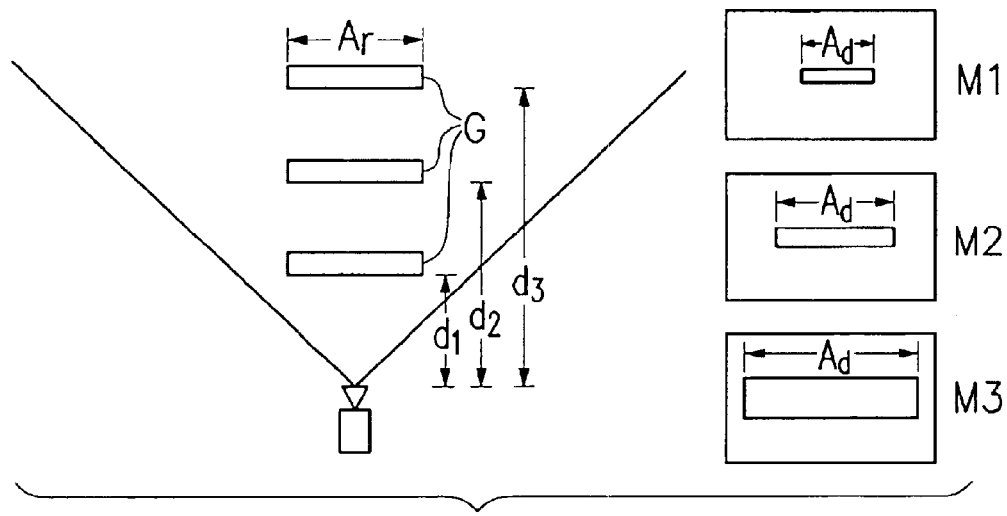

As shown in FIG. 5B, ordinarily, when the visual line direction between the polygon G and the video camera V is d1, d2, d3, the length Ad of the polygon G displayed on the monitor 3 is respectively displayed as screen M1, M2, M3 in accordance with the distance thereof. In other words, closer the distance between the polygon G and the video camera V, larger the polygon G is displayed, and farther the distance, smaller the display.

Therefore, in order to display the polygon in a fixed size regardless of changes in the distance, contrarily, the actual size of the polygon G in the virtual space can be changed in accordance with the distance. As a unidirectional element of the actual size of the polygon G, the length of the longitudinal direction of the screen is taken as an example and described below.

Figure 5C:
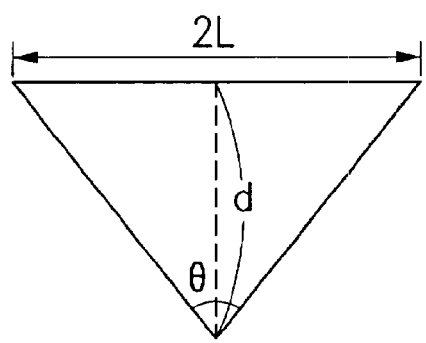

As illustrated in FIG. 5C, when setting the elevation angle of the video camera as θ, the distance between the video camera V and the polygon G as d, and the longitudinal direction of the virtual space displayed on the screen (hereinafter referred to as "screen display length") as 2L, the following formula is attained.

$\tan(\theta/2) = L/d$ $L = d \tan(\theta/2)$ \hfill (1)

Therefore, in order to fix the longitudinal direction length Ad of the polygon G displayed on the screen (hereinafter referred to as the "polygon G display length"), the proportion k (k=Ar/2L) of the screen display length 2L and the actual length Ar of the polygon G in the virtual space (hereinafter referred to as the "polygon G actual length") needs to be fixed.

Accordingly, in order to fix the proportion k, the actual length Ar of the polygon G shall be made as follows by employing the aforementioned formula (1).

$$Ar = k \times 2L \qquad (2)$$
$$= k \times 2d \, \tan(\theta/2)$$

Figure 6:
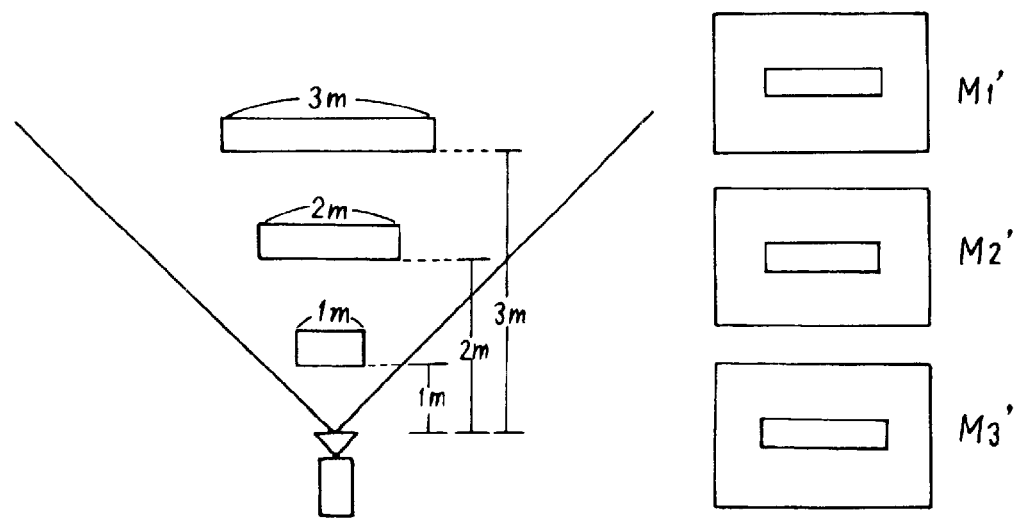
FIG. 6 is a diagram explaining the fundamental principle of the first embodiment.

For example, if the elevation angle θ of the video camera V is 90 degrees (tan (θ/2)=1), as shown in FIG. 6, and when the distance d between the video camera V and the polygon G is, for example, 1 m, 2 m, 3 m, the polygon G display length may be fixed regardless of the changes in the distance d (c.f. screen M1', M2', M3') by making the polygon G actual length 1 m, 2 m, 3 m, respectively.

Figure 7:
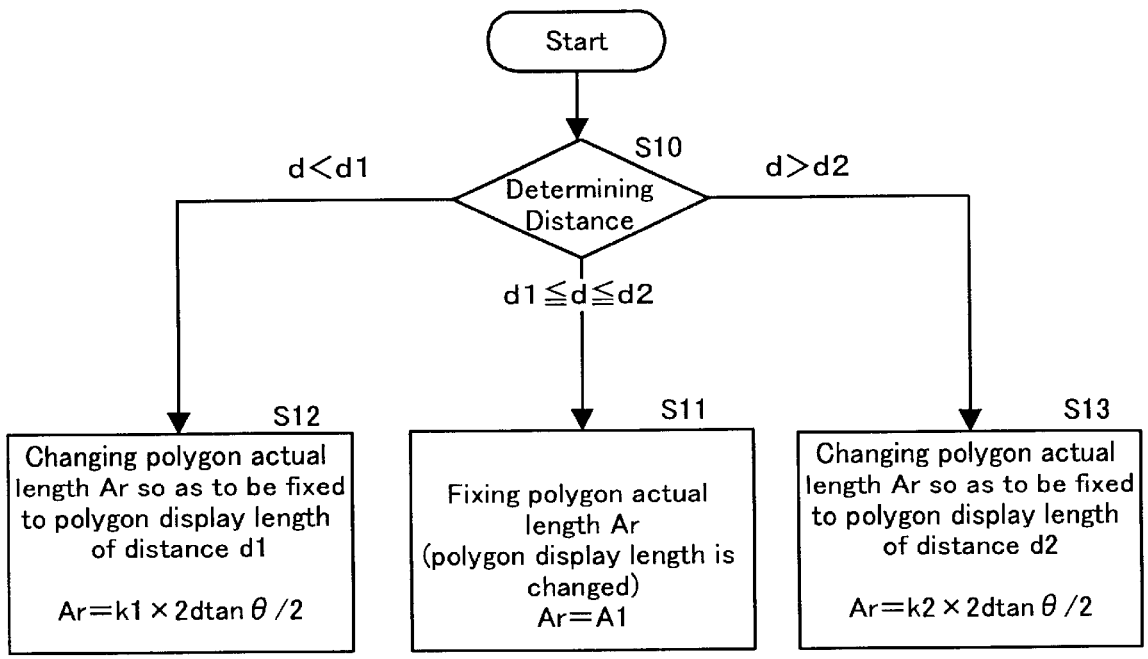
FIG. 7 is a processing flowchart of the first embodiment.

FIG. 7 is a processing flowchart of the first embodiment. The processing of the first embodiment is executed by the aforementioned geometry processor 104. The distanced between the video camera V and polygon G is determined in step S10. Then, when the distance d is longer than the first distance d1 and less than the second distance d2, which is longer than the first distance d1 (S11), the polygon G actual length Ar maintains the initial value A1 set in advance and does not change. Therefore, as the polygon G display length Ad; that is, the proportion k changes in accordance with the distance d, the polygon G will be enlarged/reduced and displayed.

Particularly, when the distance d is the first distance d1, the proportion k1 becomes as follows:

$$K1 = A1 \times 2L \qquad (3)$$
$$= A1/(2 \times d1 \, \tan(\theta/2))$$

When the distance d is the second distance d2, the proportion k2 becomes as follows:

$$k2 = A1/2L \qquad (4)$$
$$= A1/(2 \times d2 \, \tan(\theta/2))$$

Meanwhile, when the distance d is shorter than the first distance d1, the polygon G display length Ad changes the polygon G actual length Ar (S12) by utilizing the proportion k1 so as to be fixed to the polygon G display length Ad in the first distance d1. In other words, by employing the aforementioned formula (3), the polygon G actual length Ar becomes as follows.

$$Ar = k1 \times 2L$$
$$= k1 \times 2d \, \tan(\theta/2)$$

Thereby, when the distance d is closer than the first distance d1, the polygon display length Ad is able to change, regardless of the distance d, the polygon G actual length Ar in accordance with the distance d so as to be fixed to the polygon display length Ad1 of the first distance d1.

Moreover, when the distance d is farther than the second distance d2, the polygon G display length Ad changes the polygon G actual length Ar (S13) so as to be fixed to the polygon G display length Ad in the second distance d2. In other words, by employing the aforementioned formula (4), the polygon G actual length Ar becomes as follows.

$$Ar = k2 \times 2L$$
$$= k2 \times 2d \, \tan(\theta/2)$$

Thereby, when the distance d is farther than the second distance d2, the polygon display length Ad is able to change, regardless of the distance d, the polygon G actual length Ar in accordance with the distance d so as to be fixed to the polygon display length Ad2 of the second distance d2.

Figure 8A:
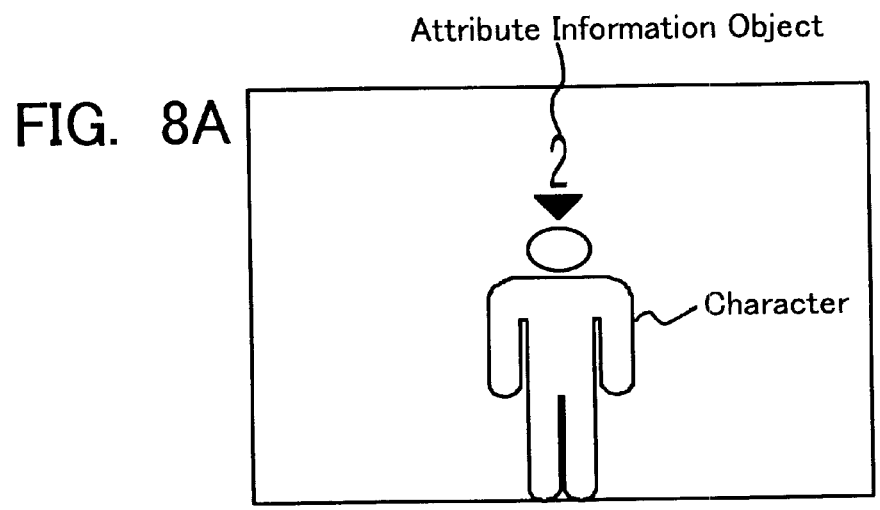
FIGS. 8A, 8B and 8C are screen examples in the first embodiment.
Figure 8B:
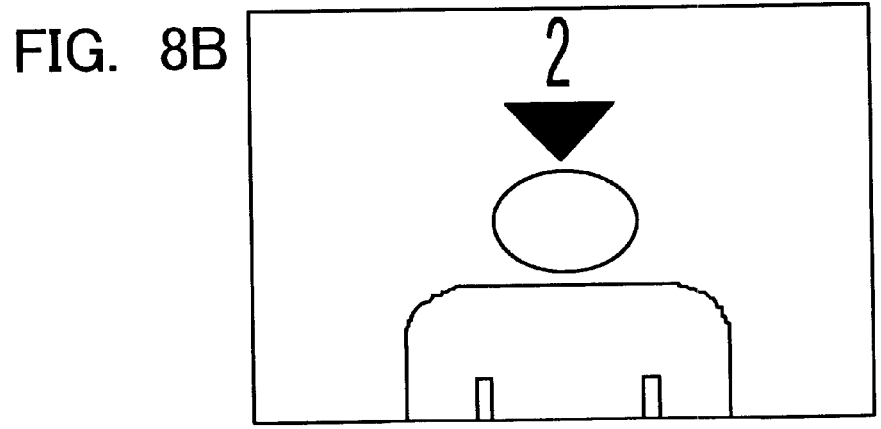
Figure 8C:
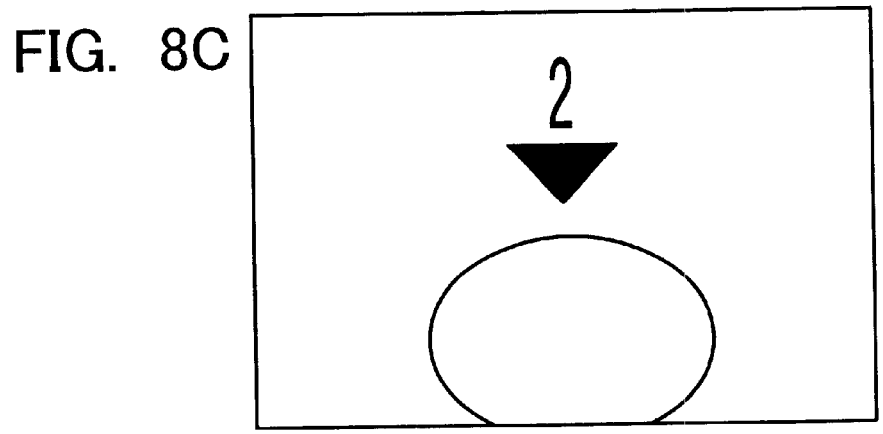
Figure 9A:
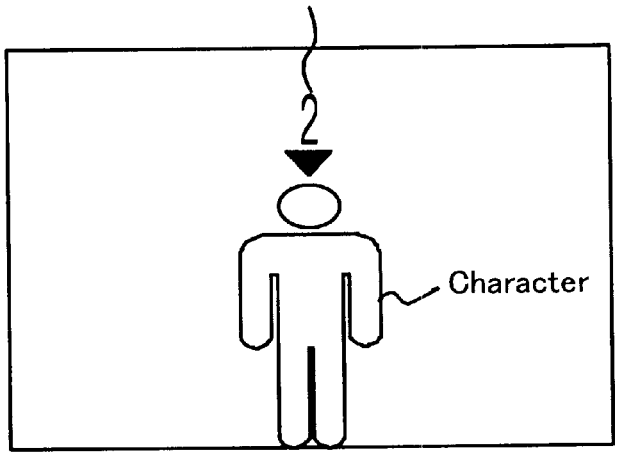
FIGS. 9A, 9B and 9C are screen examples in the first embodiment.
Figure 9B:
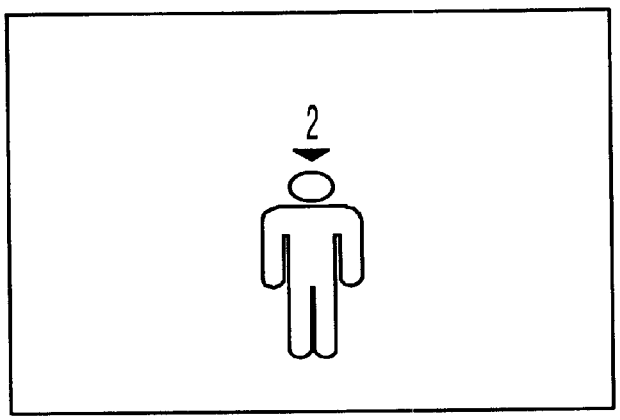
Figure 9C:
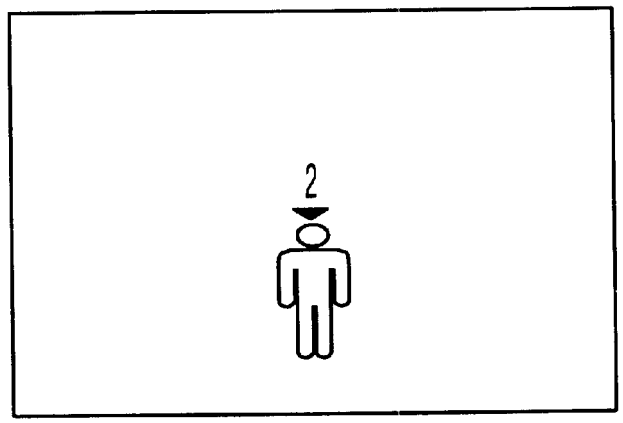

FIGS. 8A, 8B and 8C and FIGS. 9A, 9B and 9C are screen examples in the first embodiment. FIGS. 8A, 8B and 8C are examples showing a case when the distance d becomes shorter, and FIGS. 9A, 9B and 9C shows a case when the distance d becomes longer.

As shown in FIG. 8A and FIG. 8B, within a prescribed distance range (particularly when the distance d is longer than the first distance d1), the displayed game character and its attribute information object are both enlarged in accordance with the shortening of the distance d between the video camera V and the game character (or the attribute information object). However, as shown in FIG. 8C, when the distance d becomes shorter than the first distance d1, the character is enlarged and displayed in accordance with the distance d, but the size of the attribute information object is displayed in the same size of that shown in FIG. 8B (the screen of FIG. 8B shall be the screen of the first distance d1). Therefore, as the attribute information will not cover a large part of the screen, inconveniences such as the other characters being hidden by the attribute information object can be overcome, and it is thereby possible to provide an easily viewable screen to the player.

Further, as shown in FIG. 9A and FIG. 9B, within a prescribed distance range (particularly when the distance d is shorter than the second distance d2), the displayed game character and its attribute information object are both reduced along with the increase in the distance d between the video camera V and the game character (or the attribute information object). However, as shown in FIG. 9C, when the distance d becomes longer than the second distance d2, the game character is further reduced and displayed in accordance with the distanced, but the size of the attribute information object is displayed in the same size as that shown in FIG. 9B (the screen of FIG. 9B is supposed to be the screen of the second distance d2). Therefore, inconveniences such as the attribute information becoming illegible as a result of the attribute information object receding from the video camera V can be overcome, and it is thereby possible to provide an easily viewable screen to the player.

Moreover, within the prescribed distance range (d1≦d≦d2), both the attribute information and game character are enlarged/reduced and displayed, and it is therefore easy to grasp the sense of distance. Thus, even when numerous game characters are displayed in the screen, it is easy to determine which attribute information belongs to which game character.

In the aforementioned embodiment, although the method of changing the actual length of polygons in a virtual space was explained, taking an example of changing the length of a unidirectional element in the virtual space in order to avoid changing the display length of polygons, the size of the overall polygon can be changed by performing similar methods to other directional elements.

By differentiating the attribute information object (polygon data) on a game character from other objects (game characters, backgrounds, etc.), the attribute information object alone will be display controlled as described above.

Further, attribute information relating to the game character may also be displayed as a foreground image of a two-dimensional image to be displayed on the monitor, in spite of being disposed as an object in the virtual space. Even in this case, the attribute information as the foreground image is enlarged/reduced and displayed in accordance with the distance when the distance between the viewing point and game character in the virtual space is within a prescribed distance range, and displayed as an image in a fixed size, regardless of the distance, when the distance is shorter than the first distance or longer than the second distance.

Second Embodiment

The second embodiment provides a computer game device for resolving the aforementioned (Problem 2). In the second embodiment, when a battle game where three or more players can participate is in progress among a number of players less than the maximum number of players possible in the battle game and a new player starts playing the battle game, that new player determines whether he/she will participate from midcourse in the battle game in progress or start a one-player battle game against the computer based on the status of the battle game in progress. The CPU 101 that executes the game program processes the second embodiment.

The respective computer game devices transmit status signals containing operation data and status information in the respective devices (game in progress, standby, etc.) to other game devices in a prescribed timing (every ⅟₆₀ sec.). By communicating the status signals among the game devices as described above, battle games among game devices are realized.

Figure 10:
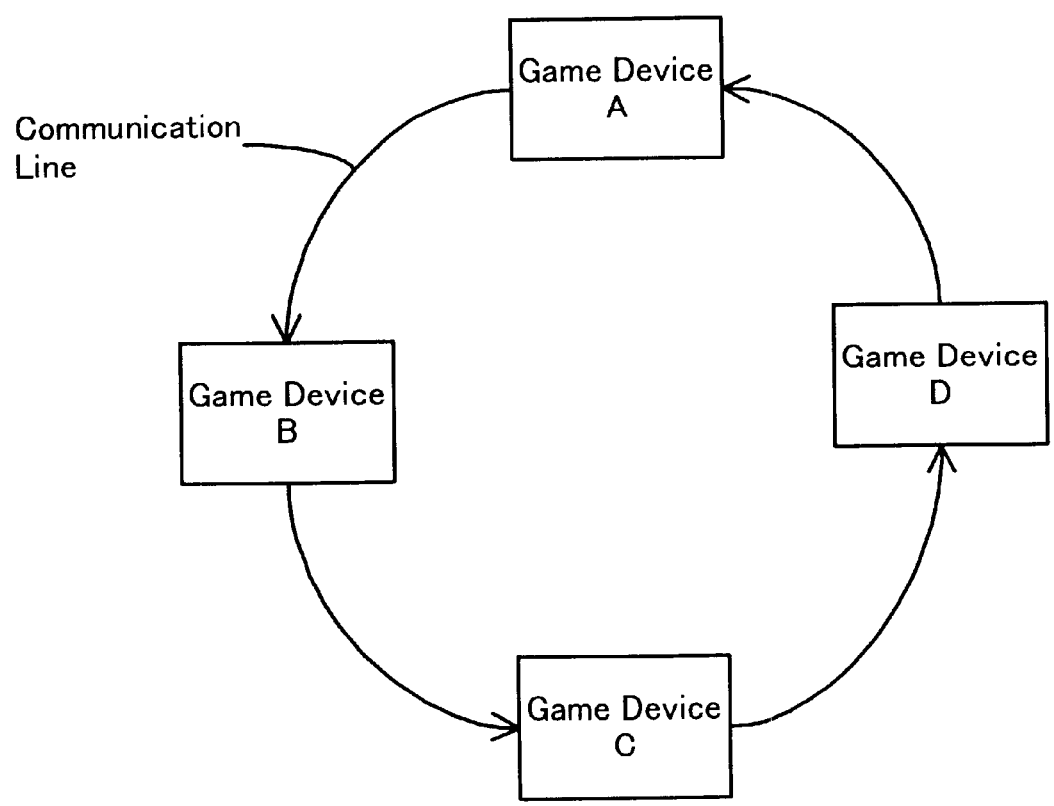
FIG. 10 is a diagram showing the connection mode of a plurality of computer game devices.

FIG. 10 is a diagram showing the connection mode of the plurality of computer game devices. In FIG. 10, four game devices are connected in a ring shape. With this type of connection mode, in prescribed intervals, the status signal of game device A is sent to game device B, the status signal of game device B is sent to game device C, the status signal of game device C is sent to game device D, and the status signal of game device D is sent to game device A. In these transmissions, the respective game devices also transmit the received status signals together. For example, game device A sends the status signal received from game device D to game device B. Like this, when the respective game devices successively transmit the received status signals, at the end, each game device receives its own status signal. For instance, game device A receives its own status signal sent three timings back from game device D. The respective game devices store four timings worth of status signals received until receiving its own status signal in its internal memory area. Therefore, status signals of the respective game devices of a certain timing are stored in the memory area.

Then, when the CPU 101, upon receiving its own status signal, reads the status signal contained in the memory area, and executes the various game processing based on such status signal. Synchronization of among the respective game devices is thereby possible.

Status signals communicated in the second embodiment as described above contain, at the least, the following information.

On game information: Information output by the game device when a battle game among players or a one-player game against a computer is in progress.

Versus information: Information output when a battle game is being played among players by such game device throughout the game.

Game character selected information: Information output by a game device to newly start a game when a player selects a game character.

Midcourse participation authorization information: Information unique to the present invention, and output by a game device executing a battle game among players or a one-player game against a computer throughout such game when the midcourse participation authorization conditions described below are satisfied.

Midcourse participation request information: Information output by the game device to newly start a game when it receives midcourse participation authorization information and is to participate in the battle game from midcourse.

Table 1 shows the conditions for midcourse participation. The game device executing either the battle game or one-player battle game determines whether or not midcourse participation is possible in prescribed intervals and outputs midcourse participation authorization information based on such determination. Then, when the game device operated by the player receives midcourse participation authorization information upon the new player starting the game, it starts the battle game, and when the authorization is not received, it starts the one-player battle game.

TABLE 1

| When the number of participants is less than a prescribed number (including cases where no one is playing the game (0 persons) and when one player is playing a one-player battle game) | When the number of participants is a prescribed number (less than maximum number of players possible) or more | |
|---|---|---|
| Authorized (when no one is playing the game, however, the game will be a one-player battle game) | When at least one game character has obtained points | Unauthorized |
| | When the elapsed time of the battle game has exceeded a prescribed time | Unauthorized |
| | Other than above | Authorized |

For example, when the maximum number of players able to battle is four (i.e., when there are four game devices), the prescribed number of players is set to three. Then, when one player is playing a one-player battle game, or when two players are playing a battle game, the game device conducting the battle game outputs midcourse participation authorization information. Therefore, as the game device to start a game with a new player will receive such midcourse participation authorization information, the game will be the battle game output from the game devices where the battle game is in progress. However, when no one is playing the game, a one-player battle game is started.

Moreover, when three players are already playing the battle game and a new player is to start a game, in accordance with Table 1 above, further classification is made in accordance with the elapsed status of the battle game currently in progress. The elapsed status is, for example, the existence of superiority or inferiority of the battle among players and, when the player is to obtain points pursuant to the progress of the battle game, the number of points may determine such superiority and inferiority.

For example, in a battle game where the game characters are fighting each other, and 1 point is obtained when an enemy character is defeated, or when the life parameter set in advance to the enemy character decreases and reaches 0 by defeating such enemy character, and the win/defeat is determined by the obtained points reaching a prescribed number of points, the game device executing the battle game will not output the midcourse participation authorization information if at least one character has obtained 1 point.

If midcourse participation is constantly permitted and midcourse participation authorization information is output even in the aforementioned case, the battle status up to then is reset and a new battle game including the new player is started. Thus, this will be highly disadvantageous for the player who has already obtained points and was playing the battle game in his/her favor. In the second embodiment, this type of disadvantage can be avoided as it determines the authorization/non-authorization of midcourse participation in accordance with the progress status of the actual battle game.

Further, the respective game devices determine the number of players playing the battle game by counting the number of the aforementioned game information (or versus information) among the status signals for each timing. Points of the respective game characters are stored and renewed in the memory of the respective game devices as game parameters.

Moreover, in a battle game with two players, midcourse participation is authorized for the following reason, regardless of the progress status of the battle game. Specifically, since players can fully enjoy the amusement of a battle game when the number of players playing the battle game is closer the to maximum number of players possible, it can be said that it would be preferable to authorize midcourse participation until the number of participating players reaches a number where the amusement of the battle game can be fully enjoyed regardless of the game progress situation. However, it is possible not to authorize midcourse participation when a relatively few number of players (two for example) is playing the battle game depending on the game progress status.

As described above, each game device executing a battle game among players less than the maximum number of players (four players in the aforementioned example), determines whether to authorize midcourse participation in accordance with the aforementioned midcourse participation authorization conditions and, when it determines that midcourse participation is possible, outputs the midcourse participation authorization information.

Then, when a new player inserts a coin in the game device which is not conducting the battle game and tries to start the game, that game device starts the battle game with other players when it receives midcourse participation authorization information from the other game devices, and starts the one-player battle game against a computer when it does not receive such authorization information.

Figure 11:
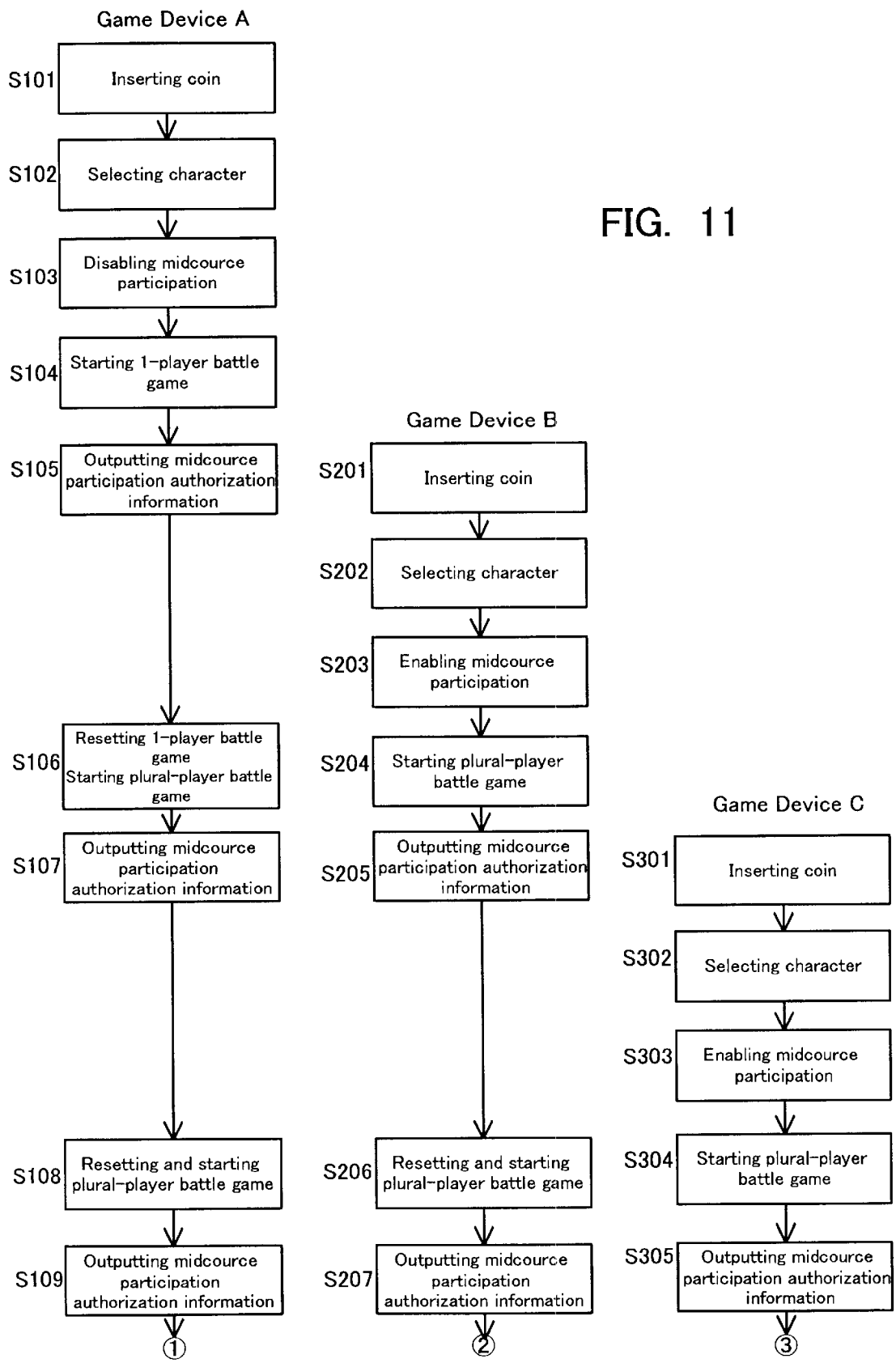
FIG. 11 is a processing flowchart of the second embodiment.
Figure 12:
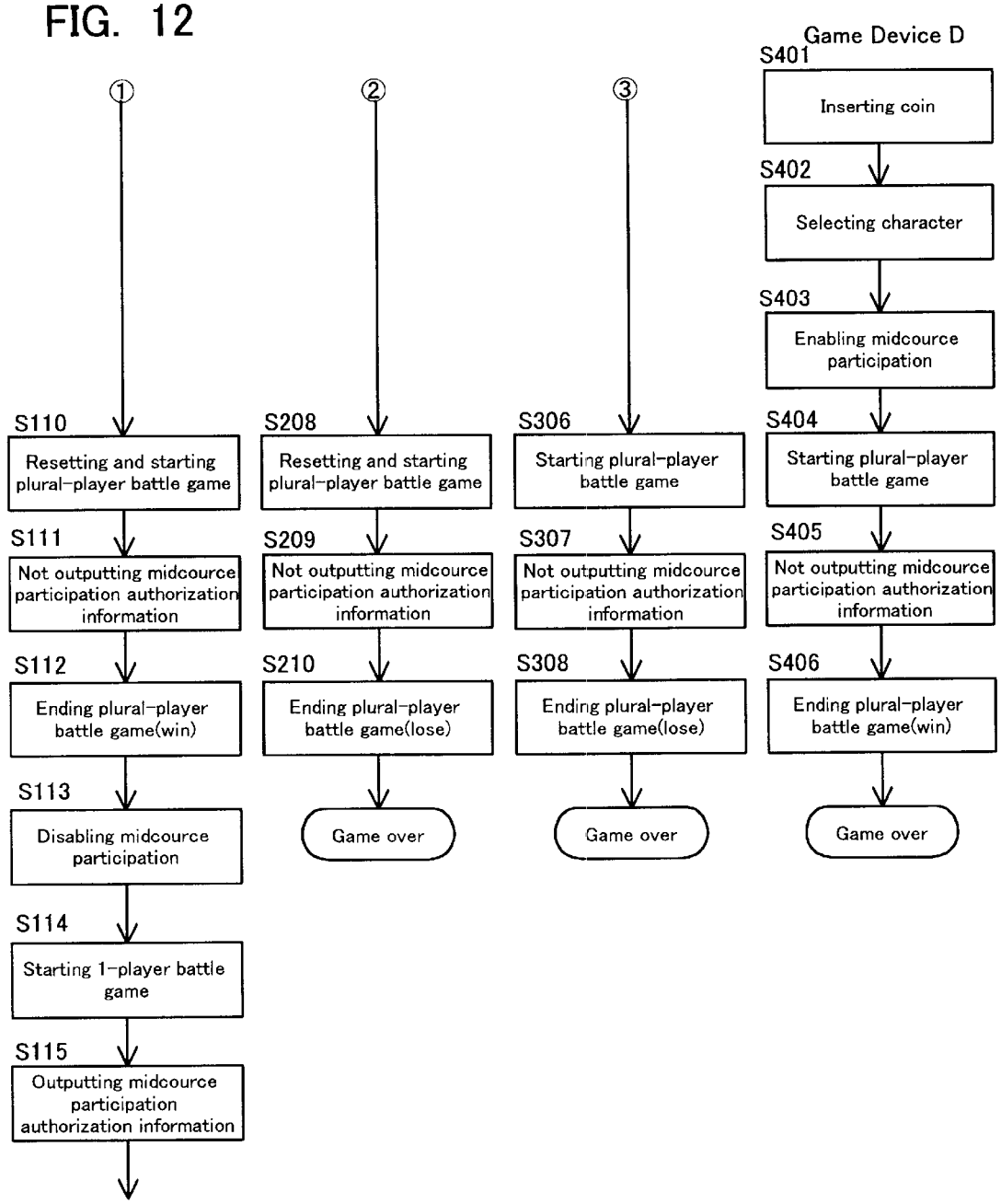
FIG. 12 is a processing flowchart of the second embodiment.

FIG. 11 and FIG. 12 are processing flowcharts of the second embodiment. In FIG. 11, game devices A, B, C and D are in a standby state where a game is not being played, and, foremost, the player inserts a coin in game device A to start the game (S101). After the player inserts the coin and conducts prescribed starting operations, a game character selection screen (not shown) is displayed on the screen of game device A. A plurality of game characters are displayed on the game character screen, and the player operates the lever and buttons to select a desired game character (S102). Here, as no game device is executing a game, game device A does not receive status signals of midcourse participation authorization information from the other game devices (S103).

Thus, game device A starts a one-player battle game against the computer (S104) and outputs midcourse participation authorization information (S105).

While game device A is executing the one-player battle game, another player inserts a coin in game device B (S201) and selects a game character as described above (S202). Here, game device B receives midcourse participation authorization information output from game device A (S203). Therefore, game device B starts a battle game with game device A (S204). Here, game device B outputs midcourse participation request information. When game device A receives midcourse participation request information from game device B in a state of outputting midcourse authorization information, it resets the one-player battle game against the computer and starts a plural-player battle game with game device B (S106).

Moreover, when the battle game between game device A and game device B is started, game devices A and B output midcourse participation authorization information (S107, S205).

Further, when a battle game is being conducted between game device A and game device B, another player inserts a coin in game device C (S301) and selects a game character as described above (S302). Here, game device C also receives midcourse participation authorization information from game devices A and B (S303). Thus, game device C starts a plural-player battle game with game devices A and B (S304). Game device C thereafter outputs midcourse participation request information as its status signal. When game devices A and B receive midcourse participation request information from game device C in a state of outputting midcourse participation authorization information, they reset the battle game currently in progress and start a new plural-player battle game among game devices A, B and C to which game device C newly joined (S108, S206).

Further, immediately after the battle game is started among game devices A, B and C, game devices A, B and C output midcourse participation authorization information (S109, S207, S305) so far as midcourse participation is authorized in accordance with the aforementioned midcourse participation authorization conditions.

Moving on to FIG. 12, when the plural-player battle game is being conducted between game devices A, B and C, another player inserts a coin in game device D (S401) and selects a game character as described above (S402) while status signals containing midcourse participation authorization information are output from the respective game devices. Here, game device D also receives midcourse participation authorization information from game devices A, B and C (S403). Thus, game device D starts a plural-player battle game with game devices A, B and C (S404). Meanwhile, when game devices A, B and C receive midcourse participation request information from game device D in a state of outputting midcourse participation authorization information, they reset the plural-player battle game currently in progress and start a new plural-player battle game among game devices A, B, C and D to which game device D newly joined (S110, S208, S306).

When the plural-player battle game is started with the maximum number of players possible, the respective game devices A, B, C and D do not output midcourse participation authorization information (S111, S209, S307, S405).

Then, game devices A, B, C and D end the plural-player battle game (S112, S210, S308, S406). Here, when the player of game device A is the winner, game device A determines whether midcourse participation authorization information is contained in the status signals from the other game devices. In this example, as the players of the other game devices have sustained a defeat against the player of game device A, the other game devices register game over and move to a standby state. Therefore, the other game devices do not output midcourse participation authorization information. Accordingly, game device A does not receive midcourse participation authorization information (S113), proceeds to the one-player battle game against the computer (S114), and repeats the aforementioned processing.

Figure 13:
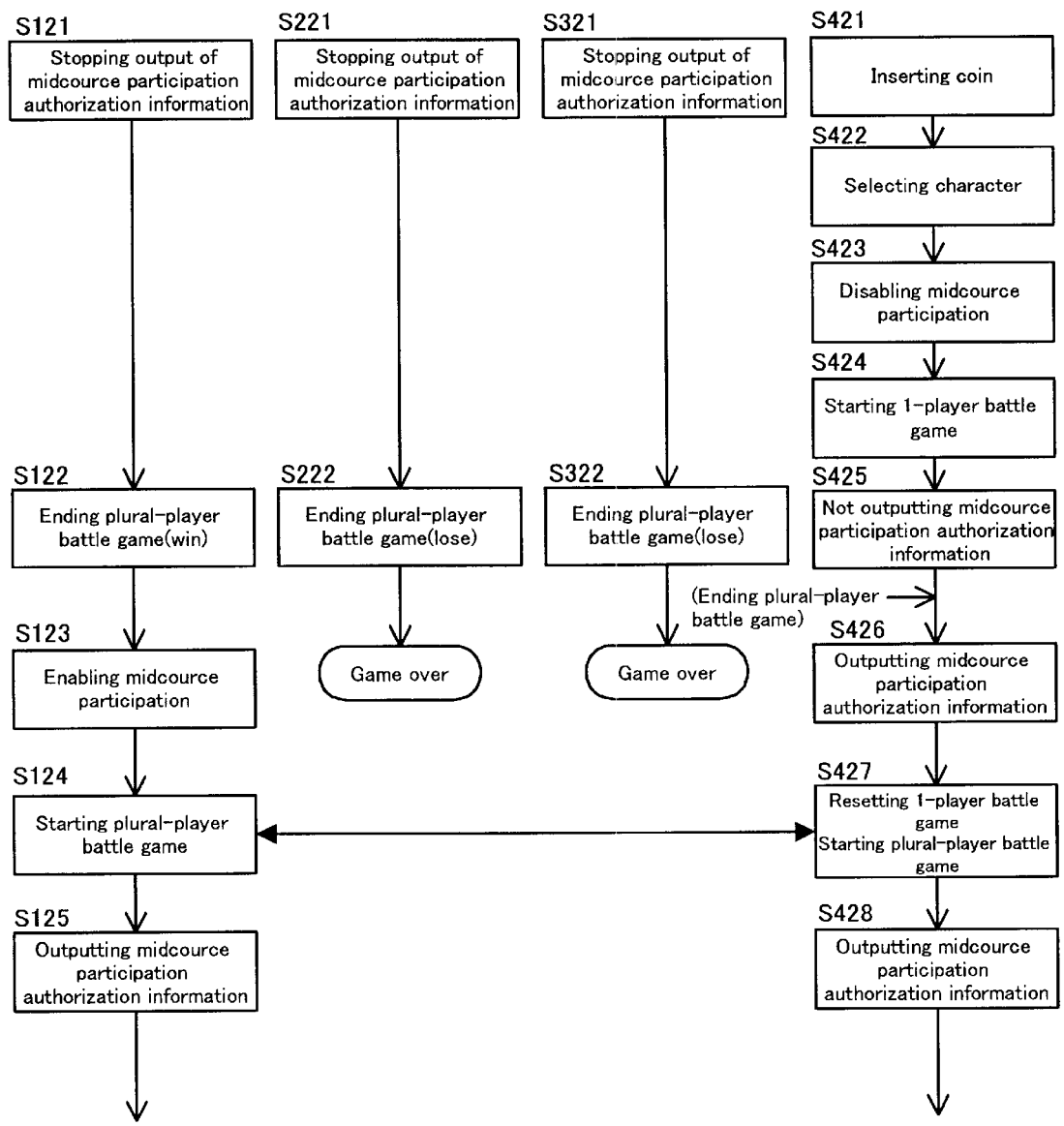
FIG. 13 is another processing flowchart of the second embodiment.

Meanwhile, FIG. 13 is another processing flowchart of the second embodiment. FIG. 13 is a processing flowchart in the case where a game is started in game device D after the change from the midcourse participation authorization state to the midcourse participation non-authorization state pursuant to the aforementioned midcourse participation authorization conditions when a battle game is being played among game devices A, B and C in FIG. 12 described above. Thus, in FIG. 13, as the processing steps S101 to S109 in game device A, processing steps S201 to S207 in game device B and processing steps S301 to S305 in game device C are the same as those shown in FIG. 11, the illustration and explanation thereof are omitted.

In game devices A, B and C, when the elapse in battle progresses and it changes from the midcourse participation authorization state to the midcourse participation non-authorization state, the respective game devices A, B and C suspend the output of the midcourse participation authorization information (S121, S221, S321).

Thereafter, another player inserts a coin in game device D (S421) and selects a game character as described above. Here, as game device D does not receive midcourse participation authorization information from the other game devices, it cannot participate in the battle game from midcourse (S423), and game device D starts a one-player battle game against the computer (S424). Here, as game device D receives versus information as status signals from the other game devices, game device D does not output midcourse participation authorization information even if it starts a one-player battle game (S425).

Game devices A, B and C end the plural-player battle game(S122, S222, S322) while game device D is executing the one-player battle game against the computer. When the battle game is finished, game devices A, B and C that ended the battle game stop the output of versus information as status signals. Game device D begins outputting midcourse participation authorization information (S426) when it stops receiving versus information from the other game devices A, B and C.

When the player of game device A wins pursuant to the battle among game devices A, B and C, for example, game device A determines whether midcourse participation authorization information is contained in the status signals from the other game devices. In this example, game device A receives midcourse participation authorization information from game device D (S123). Thus, game device A transmits midcourse participation authorization information as its status signal and starts a battle game with game device D (S124). Meanwhile, game device D receives midcourse participation authorization information and starts a battle game with game device A (S427). Then, game devices A and D output midcourse participation authorization information (S125, S428).

As described above, in the second embodiment, midcourse participation conditions are set in advance, and the game device conducting the battle game outputs midcourse participation authorization information if midcourse participation is possible pursuant to such midcourse participation conditions, and does not output midcourse participation authorization information if midcourse participation is unauthorized. Therefore, the game device to newly start a game determines whether to conduct a battle game by participating in midcourse or a one-player battle game against a computer depending on whether it receives midcourse participation authorization information from the other game devices. It is thereby possible to process the authorization/non-authorization of midcourse participation.

Further, game devices in a standby status will, while it is receiving midcourse participation authorization information from the other game devices, display a message on its screen stating that midcourse participation is possible at present if a coin is inserted. Such game devices in the standby status may display a message to the effect that a one-player game is only possible while it is not receiving midcourse participation authorization information. The player may thereby easily know which game mode it will be when he/she inserts a coin in a vacant game device.

Third Embodiment

The third embodiment provides a computer game device for resolving the aforementioned (Problem 3). For example, in a battle game such as a combat game, each game character is provided with a prescribed physical energy value (energy value). This energy value decreases when attacked by the opponent, and the game character will sustain a defeat when such energy value runs out (reaches 0).

When the energy value of a plurality of game characters remains as a result of the victory or defeat not being finalized within the time limit of a battle game, the third embodiment does not judge the victory or defeat by the remaining energy value as conventionally, but rather numerically converts the degree of activity of the game character as a new victory/defeat judgment standard and judges the victory/defeat thereby. The value of this degree of activity of the game character, in principle, is set such that it increases for each attack against an enemy character, and decreases upon taking prescribed evasive maneuvers. It is thereby possible to resolve the disadvantage of a game character running away from winning. The third embodiment is processed by the CPU 101 that executes the game program.

The third embodiment is now described in detail. The degree of activity of the game character is, for example, calculated pursuant to the following standards (1), (2), (3), (4) and (5).

(1) Points are added in accordance with the scope of damage to the enemy character and difficulty of the attacking method for each attack made to the enemy character.

$$\text{Added points} = 100 \times (a) \times (b)$$

(a) Scale factor set forth by the attack attribute

Ordinary attack ×1

Special attack ×2

Weapon attack ×2

Throw attack ×2

Combination attack ×2

(b) Scale factor set forth by number of successful combination techniques

Once ×1

Twice ×2

Three times ×3

Four times ×4

Five times ×8

Six times or more ×16

By adding points pursuant to the attacks made to the enemy character as shown above, it is possible to rightfully judge the victory/defeat in accordance with the degree of activity of the player since players will be able to obtain high scores by aggressively participating in the attack instead of running away and not attacking.

Here, an ordinary attack is the attacking motions of kicks and punches made by relatively simple operations of the button and lever (merely pushing the button, etc.). A special attack is, for example, an attack made by kicks and punches that are able to inflict larger damage than the ordinary attack, and requires more complex operations than the ordinary attack. A weapon attack is an attack of picking up a prescribed weapon such as a rod in the virtual space and using it to attack the enemy character. A throw attack is an attack of throwing the enemy character and is capable of inflicting larger damage than the ordinary attack. Further, a combination attack is when the aforementioned attacks are made in sequence, and becomes a combination attack when another attack is made within a prescribed time after the first attack. The operational difficulty for the player increases pursuant to the continuance of the combination attack, and the scale factor increases accordingly.

(2) Points are deducted in accordance with the decrease in the energy value that decreases for each attack made by the enemy character.

Deducted points=deducted energy value×100

The degree of activity of the game character is evaluated by the plus portion of attacking and the minus portion of sustaining damage. Therefore, the plus portion of attacking in aforementioned section (1) is calculated as well as the minus portion of sustaining damage in this section (2). The energy is given an initial value of "100", for example, and decreases a prescribed value upon sustaining damage from the enemy character. In this section (2), the decrease in this energy value is considered as the minus portion of the degree of activity of the game character.

(3) Certain points are added upon defeating an enemy character (when decreasing the energy value of the enemy character to 0).

Added points: 10000

As the purpose of a battle game is to defeat the enemy character, bonus points are added when such objective is attained.

(4) Certain points are added each time an item is acquired depending on such item.

Added points: 1000 or 500

An item is, for example, a prescribed object that appears upon defeating a game character. And when the game character acquires such item pursuant to the operation of the player, prescribed points are added in accordance with the type of item. As the operation for acquiring the item also requires the operational technique of the player, it is preferable that such aggressive action by the game character be considered in the degree of activity of the game character.

(5) When an evasive maneuver is continued for more than a prescribed time, points are deducted during such evasive maneuver after the elapse of such prescribed time.

Points deducted per time unit (1/60 sec.)=10

In a battle game by three or more game characters, at least one more game character exists other than the game characters fighting one-on-one. It is possible for such game character to merely observe the battle between the other game characters without participating in such battle.

Therefore, for one, it is possible to judge the act of not conducting prescribed attack operations for more than a prescribed time as an evasive maneuver.

Moreover, operations for avoiding attacks from enemy characters (e.g., operation for quickly moving the character) are set in the game device. Therefore, one of the players in battle may substantially avoid the battle even if he/she is battling the enemy character by continuing this evasive operation. Thus, secondly, it is possible to judge the act of continuing this evasive operation for more than a prescribed time as an evasive maneuver.

Furthermore, more points (20 points for example) may be decreased when such aforementioned evasive maneuver is made immediately prior to the end of the time limit (e.g., when there is less than 20 second till time up).

Moreover, in order to avoid the wrongful act of a player avoiding the deduction of points by restarting the evasive maneuver immediately after ceasing the evasive maneuver right before the elapse of the aforementioned prescribed time, which would be judged as an evasive maneuver, it may also be judged that an evasive maneuver is being continued if the same evasive maneuver is restarted within a prescribed time after finishing the initial evasive maneuver.

In addition, the length of the prescribed time for judging that an evasive maneuver is being continued does not have to be constantly fixed, and may be changed in accordance with the situation. For instance, it is possible to make this judgment on the evasive maneuver more strict toward the end of the game by shortening the prescribed time when nearing the end of the time limit (20 seconds before the end).

Further, for players with noticeable deduction by repeated evasive maneuvers, as it can be judged that such player is intentionally avoiding battle, the prescribed time may also be shorted in a similar manner. Contrarily, for players that are aggressively participating in the attack and hardly any points are deducted from evasive maneuvers, the prescribed time may be lengthened to make it difficult to deduct points.

Moreover, the interval for judging whether the evasive maneuver is being conducted continuously when suspending and then restarting such evasive maneuver may also be changed in accordance with the situation in a similar manner. Upon giving a penalty, it is possible to make the judgment of continued evasive maneuver easier by lengthening this interval.

As described above, by numerically converting the degree of activity of the respective game characters during battle, it is possible to rightfully judge the victory/defeat by judging such victory/defeat by the degree of activity of the respective game characters, and not by the remaining energy value of each game character when the victory/defeat is not finalized within the time limit.

Figure 14:
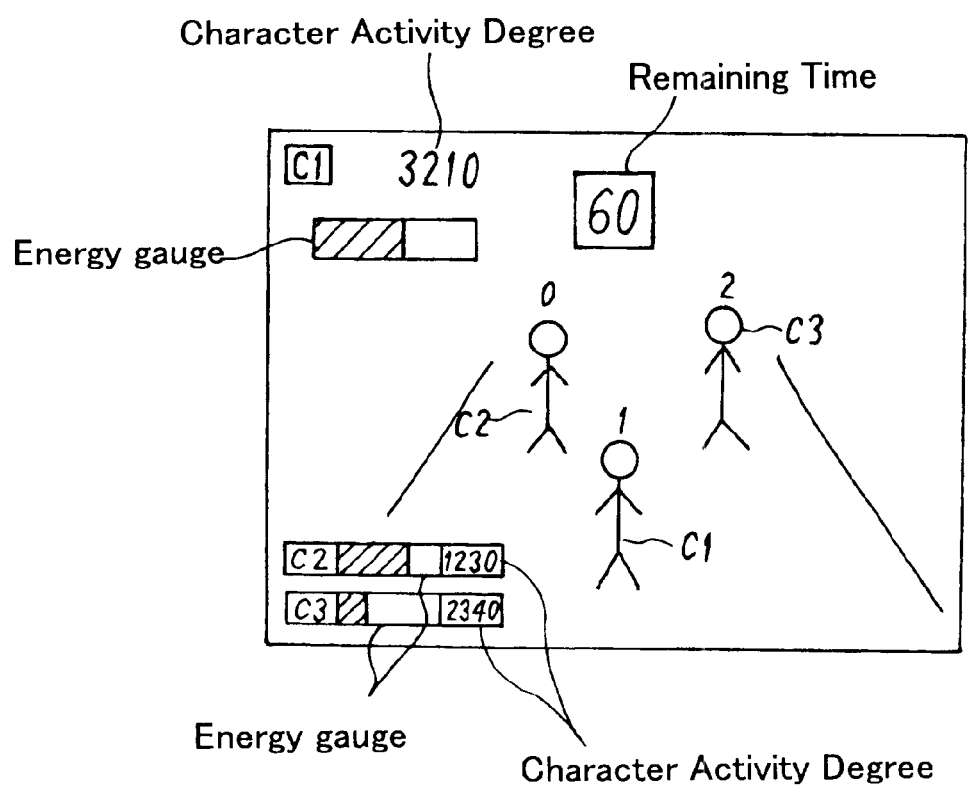
FIG. 14 is an example of a screen displaying the degree of activity of the game character.
Figure 15A:
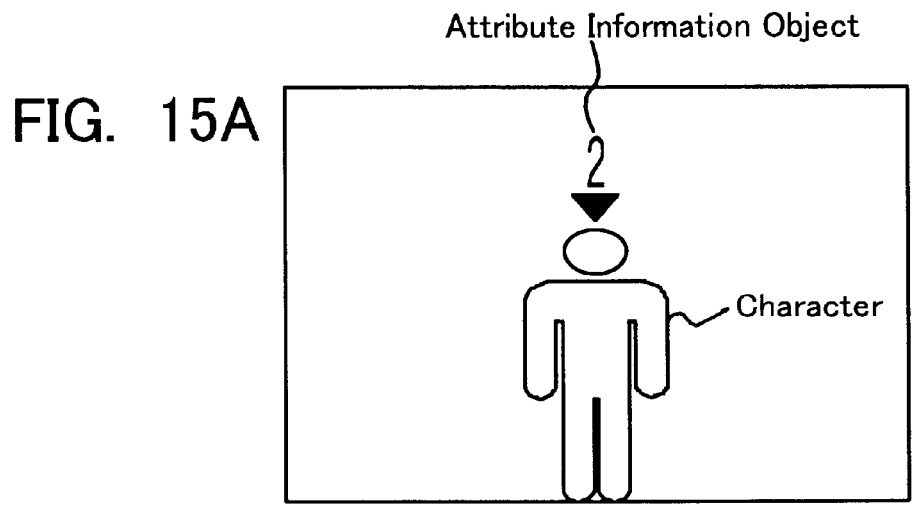
FIGS. 15A, 15B and 15C are examples of a screen displaying the game character and its attribute information.
Figure 15B:
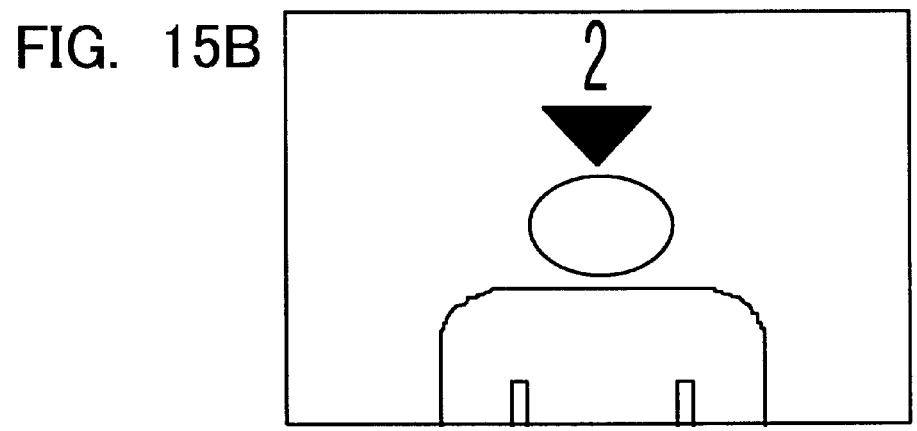
Figure 15C:
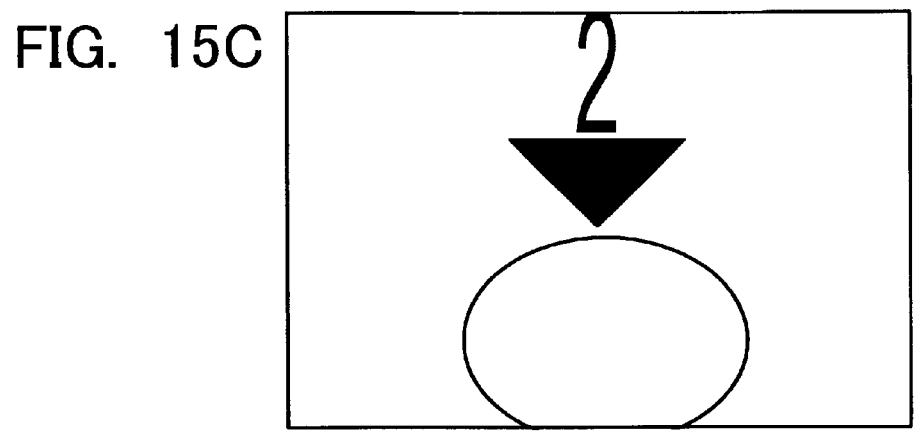
Figure 16A:
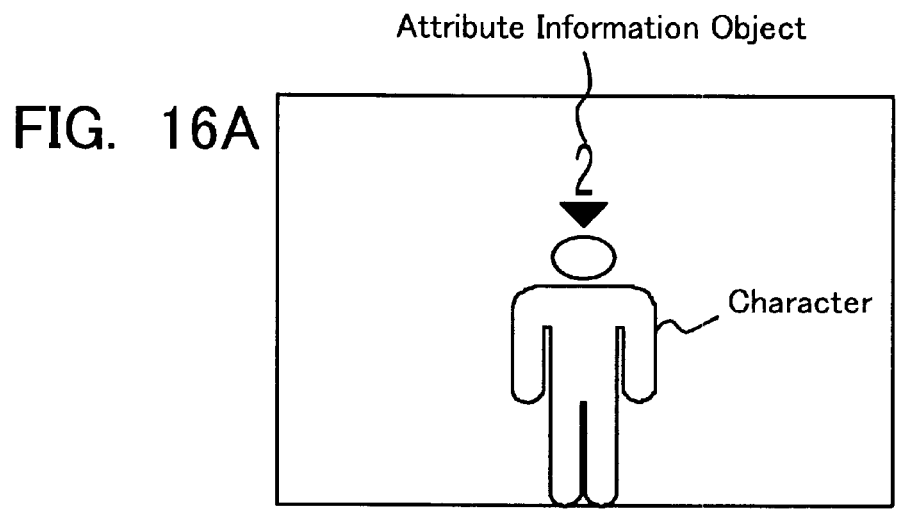
FIGS. 16A, 16B and 16C are examples of a screen displaying the game character and its attribute information.
Figure 16B:
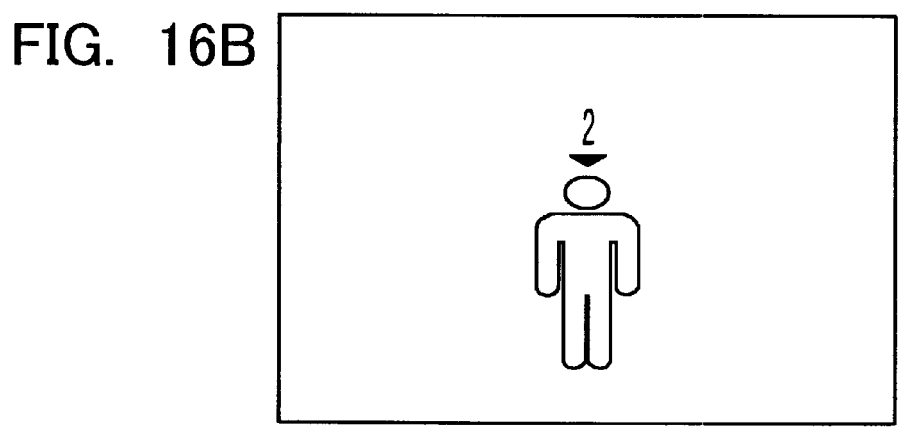
Figure 16C:
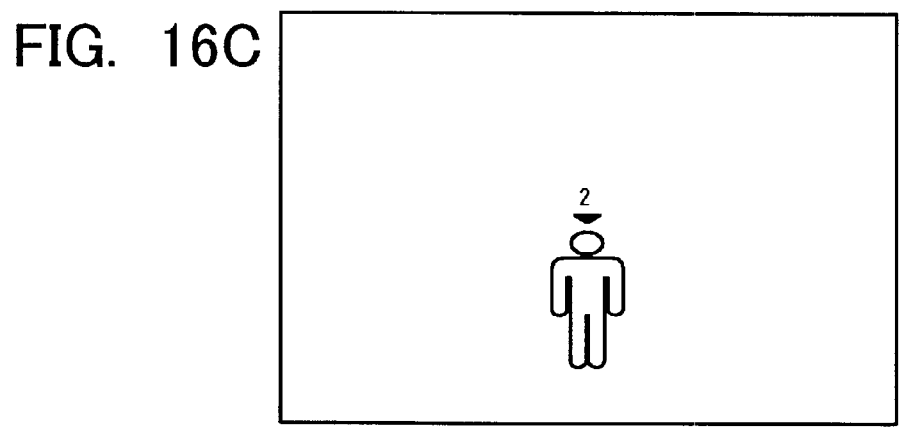

FIG. 14 is an example of a screen displaying the degree of activity of the game characters. FIG. 14 shows a state where characters C1, C2 and C3 are battling each other. The remaining time and an energy gauge for visually showing the remaining energy value of the respective characters C1, C2 and C3 are displayed on the screen. The numerically converted degree of activity of the respective game characters is also displayed together with the respective energy gauges.

As described above, according to the third embodiment, when the victory/defeat of the battle is not finalized within the remaining time limit, the victory/defeat is judged by the degree of activity evaluated by the overall actions of the game characters during battle, and not pursuant to the remaining energy value as conventionally. It is therefore possible to rightfully judge the victory/defeat.

According to the present invention, when a game character and its attribute information are to be displayed on the computer game screen and the display size of the game character is to be enlarged or reduced, it is possible to avoid disadvantages such as the attribute information being overly enlarged and thereby covering a large portion of the screen or being overly reduced and thereby becoming illegible by fixing the display size of the game character's attribute information, and provide an easily viewable screen to the player.

Moreover, according to the present invention, when a battle game is in progress among a number of players less than the maximum number of players possible in a battle game where three or more players can participate and a new player starts enters the battle game, it is determined whether or not midcourse participation should be authorized in accordance with the status of the battle game in progress or the elapsed time. It is thereby possible to avoid the inconvenience of the player who has playing the battle game in his/her favor from encountering the disadvantage of the battle game being reset pursuant to such midcourse participation. Moreover, the business efficiency will be increased as it is possible to avoid the battle game from being reset immediately before the end of the game.

Further, according to the present invention, the degree of activity of the game character during the battle game is calculated, and the victory/defeat is judged pursuant to such degree of activity of the game character when the victory/defeat of the battle is not finalized within a time limit. Therefore, in comparison to cases of judging the victory/defeat by the remaining energy, it is possible to make a rightful judgment of victory/defeat by preventing a player that runs away in the battle game or fights in a manner of not decreasing one's energy from winning.

The scope of protection of the present invention shall not be limited to the aforementioned embodiments, and shall cover the invention claimed herein and the equivalents thereof.

What is claimed is:

1. An image display method for displaying on a screen a image of a virtual space viewed from a viewing point coordinates, which is set in a coordinate system of said virtual space in which a first display object and a second display object showing an attribute information of said first display object are disposed, said second display object being displayed near said first display object and a display size of said second display object depending upon a distance between said viewing point coordinates and said second display object, the method comprising the steps of:

obtaining a distance between said viewing point coordinates and at least one of said first display object and said second display object in said virtual space; and displaying said second display object on the screen in a fixed display size when the obtained distance is shorter than a first distance or when the obtained distance is longer than a second distance.

2. The image display method according to claim 1, wherein said fixed display size is the display size of said second display object on the screen corresponding to said first distance when the obtained distance is shorter than said first distance, and said fixed display size is the display size of said second display object on the screen corresponding to said second distance when the obtained distance is longer than said second distance.

3. The image display method according to claim 1, wherein said second display object is displayed in the fixed display size on the screen by changing a size in said virtual space of said second display object in accordance with the obtained distance.

4. A computer program product embedded with a computer program having processes for displaying on a screen an image of a virtual space viewed from a viewing point coordinates, which is set in a coordinate system of said virtual space in which a first display object and a second display object showing attribute information of said first display object are disposed, comprising the processes of:

obtaining a distance between said viewing point coordinates and at least one of said first display object and said second display object in said virtual space; and displaying said second display object on the screen in a fixed display size when the obtained distance is shorter than a first distance or when the obtained distance is longer than a second distance.

5. The computer program product according to claim 4, wherein said fixed display size is the display size of said second display object on the screen corresponding to said first distance when the obtained distance is shorter than said first distance, and said fixed display size is the display size of said second display object on the screen corresponding to said second distance when the obtained distance is longer than said second distance.

6. The computer program product according to claim 4, wherein said second display object is displayed in the fixed display size on the screen by changing a size in said virtual space of said second display object in accordance with the obtained distance.

* * * * *